Jan. 20, 1942.                T. B. CHACE                2,270,267
                                 MOLD
                  Original Filed Aug. 12, 1937    2 Sheets-Sheet 1
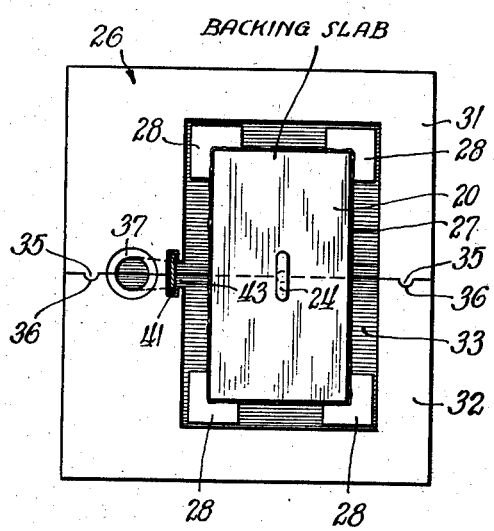
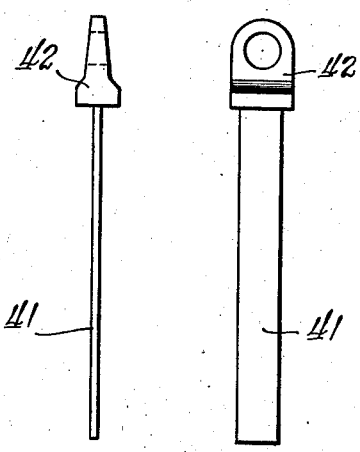
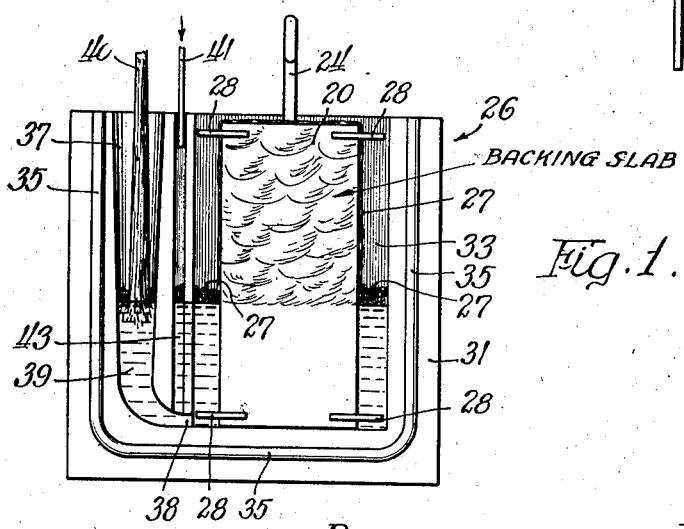
Inventor:
Thomas B. Chace.

Jan. 20, 1942.  T. B. CHACE  2,270,267
MOLD
Original Filed Aug. 12, 1937  2 Sheets-Sheet 2
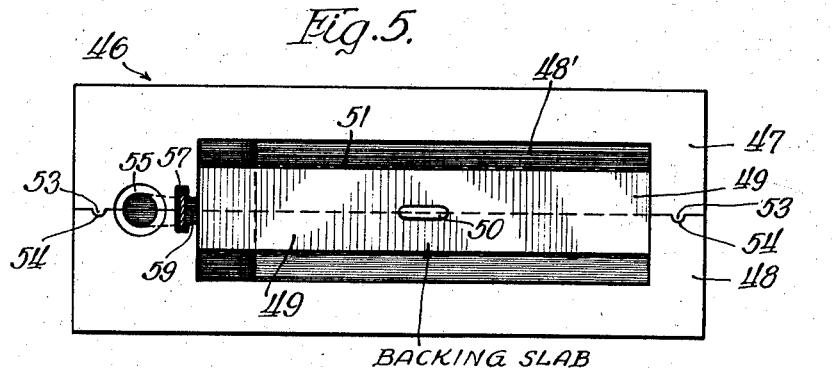
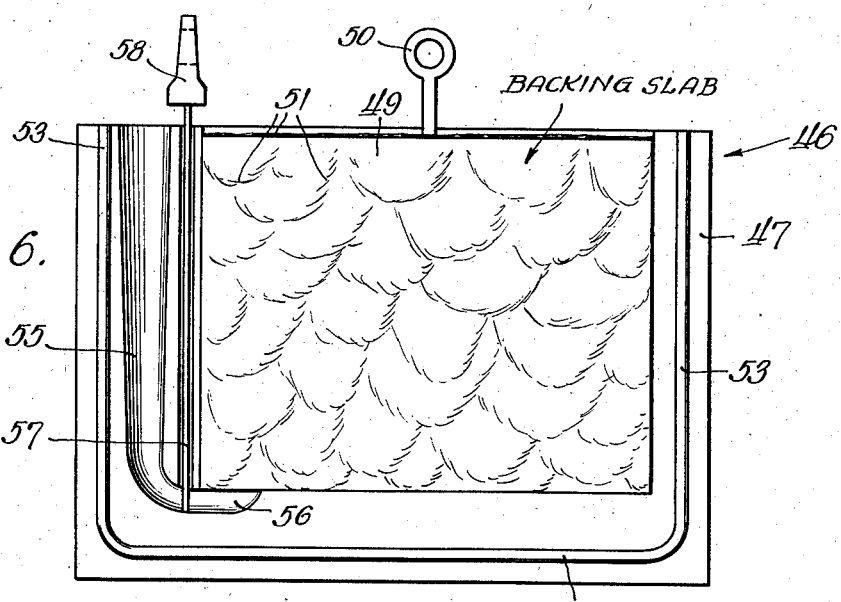
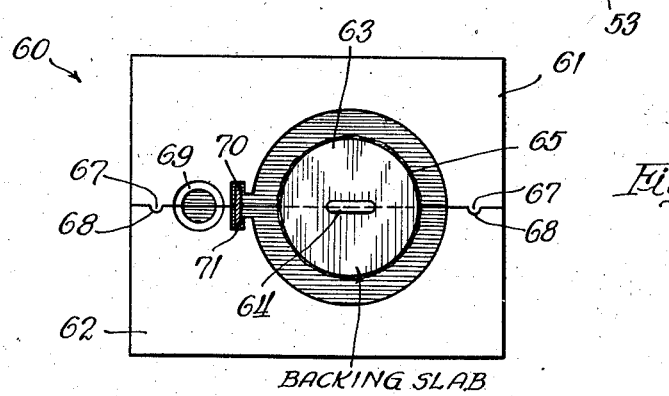
Inventor:
Thomas B. Chace.

Patented Jan. 20, 1942

2,270,267

UNITED STATES PATENT OFFICE 2,270,267

MOLD

Thomas B. Chace, Winnetka, Ill., assignor to Clad Metals Industries, Inc., Chicago, Ill., a corporation of Illinois Original application August 12, 1937, Serial No. 158,656. Divided and this application December 26, 1939, Serial No. 310,894

1 Claim. (Cl. 22—116)

My invention relates, generally, to means for manufacturing composite metal slabs and it has particular relation to the making of such slabs by casting a cladding metal onto one or more surfaces of a backing slab disposed in a vertical mold.

This application is a division of my copending application, Serial No. 158,656, filed August 12, 1937, now Patent No. 2,211,922.

An important object of my invention is to provide improved means for cladding a facing metal onto a backing metal by casting in vertical molds to obtain a diffused bond between the facing metal and the backing metal that is capable of being worked without the cladding metal separating from the backing metal.

Another object of my invention is to provide for cladding opposite faces of a steel backing slab with different facing metals, and particularly with facing metals having different melting temperatures.

A further object of my invention is to provide an improved separable mold construction for receiving a preheated backing slab and which is adapted for vertical casting therein of metal for cladding on one or more of the surfaces of the backing slab.

Still another object of my invention is to provide for bottom pouring of the cladding metal in the improved mold constructions.

Other objects of my invention will, in part, be obvious and in part appear hereinafter.

Accordingly, my invention is disclosed in the embodiments thereof shown in the accompanying drawings, and it comprises the features of construction, combination of elements and arrangement of parts which will be exemplified as hereinafter set forth, and the scope of the application of which will be indicated in the appended claim.

For a more complete understanding of the nature and scope of my invention, reference may be had to the following detailed description, taken in connection with the accompanying drawings, in which:

Figure 1 is a vertical sectional view of one embodiment of the improved mold construction, showing the backing slab in place and the cladding metal being poured;

Figure 2 is a top plan view of the mold and backing slab shown in Figure 1;

Figures 3 and 4, respectively, are side and front elevational views of a gate that may be employed in connection with the various types of molds shown in the drawings;

Figure 5 is a top plan view of a mold that is arranged to clad the opposite sides of a backing slab;

Figure 6 is a view in side elevation of the construction shown in Figure 5, one-half of the separable mold having been removed to show the details of construction; and Figure 7 is a top plan view of a separable mold for casting cladding metal onto the surface of a cylindrically shaped backing slab.

With a view to practicing my invention, a steel backing slab 20, Figure 1, of suitable size is cleaned on the welding surfaces, preferably by sand blasting, and then lowered into a molten bath of viscous substance heated in a suitable manner. After the backing slab 20 has been preheated to the desired extent, it may be removed from the bath and transported to the mold shown generally at 26 in Figures 1 and 2 of the drawings. As shown at 27 in Figure 1, the surfaces of the backing slab 20 are covered by a layer 27 of the material of the bath, so that during transit to the mold 26 the surfaces are prevented from coming into contact with the air and are, therefore, not oxidized.

With a view to centering the backing slab 20 in the space provided therefor in the mold 26, guide members 28, in the form of steel plates, may be welded to the upper and lower corners, as illustrated, thereby insuring that a coating of substantially uniform thickness will be applied to the backing slab. Preferably, the guide members 28 are welded into place before the backing slab 20 is sand blasted.

As shown in Figure 2 of the drawings, the mold 26 comprises two sections 31 and 32 which, when fitted together, provide a mold space 33 for receiving the backing slab 20. The opposing faces of the sections 31 and 32 are provided with a tongue 35 and a groove 36, respectively, to prevent the escape of the cladding metal along the parting line of the mold 26. If desired, suitable clamping means may be provided for insuring that the sections 31 and 32 will not be separated while the cladding metal is being poured.

It is preferable to provide for bottom pouring of the cladding metal, and for this purpose I have provided a pouring sprue or spout 37 having at its lower end a gate 38 that opens into the mold space 33. The cladding metal 39 is poured into the sprue or spout 37, as indicated by the stream of molten cladding metal 40, and it fills the mold space 33 from the bottom thereof. As the cladding metal 39 rises upwardly in the mold space 33, the slag or flux from the bath, as indicated by the reference character 27, and other inclusions, will float to the surface readily, as indicated. It will be observed that the pouring sprue or spout 37 is positioned along the parting line between the two sections 31 and 32 of the mold 26. This is an important feature of my invention, for it facilitates the separation of the two sections 31 and 32 after the cladding metal has solidified.

In order to further facilitate removal of the mold sections 31 and 32, a valve member 41 (Figures 3 and 4), having a handle 42 at its upper end, is adapted to be slidably mounted in a suitable groove 43 that, as shown in Figure 2, opens into the mold space 33. The valve 41 may be formed of a suitable piece of steel strip and at its lower end it is arranged to completely close the gate 38. On cooling of the cladding metal 39, the portion thereof that remains in the pouring sprue or spout 37 will be separated from the rest of the cladding metal in the mold 26 by the closing of the gate 38 with the valve 41.

In order to prevent the cladding metal 39 from welding to the surfaces of the mold 26 with which it comes in contact, and the valve member 41, these surfaces are provided with a suitable covering material, such as graphite, before the backing slab 20 is inserted. The cladding metal then welds only to the surfaces of the backing slab 20 in the intended manner, and it is a simple matter to remove the mold 26 therefrom.

By having the sprue or spout 37 at the parting line of the mold sections 31 and 32, the metal that solidifies therein is easily removed on parting, so that the mold members 31 and 32 may again be used. Thus, if the sprue 37 were entirely within one or the other of the mold sections 31 or 32, it would be difficult to remove the solidified metal therefrom after cooling.

In Figures 5 and 6 of the drawings I have illustrated a mold, shown generally at 46, that comprises sections 47 and 48 for receiving in a mold space 48' provided thereby a backing slab 49. In this embodiment of the invention the backing slab 49 is to be provided with cladding metal on two sides only and, therefore, the other sides are not intended to be clad and are arranged to fit snugly against the ends of the mold space 48', as illustrated. A suitable eye 50 may be provided for lifting the backing slab 49 from the preheating bath to the mold 46. The layer 51 of slag or flux from the bath serves to protect the welding surfaces of the backing slab 49 from oxidation, as previously described. The sections 47 and 48 are provided, respectively, with a tongue 53 and a groove 54 to prevent escape of the molten cladding metal along the parting line of the mold. A pouring sprue or spout 55 is provided having a gate 56 at the bottom to provide for bottom pouring of cladding metal into the mold space 48' for the reasons set forth hereinbefore. It will be observed that the gate 56 extends across the bottom of the mold space 48' to permit the flow of the molten cladding metal into the spaces between the surfaces of the backing slab 49 to be cladded and the opposite walls of the mold sections 47 and 48. A suitable valve member 57 having a handle 58 is provided in a suitable recess 59 for separating the molten cladding metal in the pouring sprue or spout 55 and the gate 56, to facilitate removal of the backing slab 49 after the metal has solidified. It is important to have the pouring sprue or spout 55 and the gate 56 on the parting line, as explained heretofore.

In Figure 7 of the drawings I have illustrated a separable mold 60 comprising sections 61 and 62 that is of the same general construction as described hereinbefore, but which is especially designed for applying cladding metal to the surface of a backing slab 63 having a generally cylindrical shape. As shown, the backing slab 63 is provided with an eye 64 for lifting it into and out of the preheating bath and transporting it to the mold 60. During transit the backing slab 63 is protected by a layer 65 of slag or flux that is picked up from the bath as previously described. The sections 61 and 62 may be provided with an interfitting tongue 67 and groove 68 along the parting line to prevent escape of the cladding metal in the molten state. A pouring sprue or spout 69 may be provided along the parting line for bottom pouring of the cladding metal, and a valve member 70, similar to the valve member 41 of Figures 3 and 4, may be provided in a suitable groove 71 for segregating the cladding metal in the pouring sprue or spout from that in the gate, for the reasons set forth hereinbefore.

Since certain further changes may be made in the foregoing constructions and different embodiments of the invention may be made without departing from the scope thereof, it is intended that all matter shown in the accompanying drawings or described hereinbefore shall be interpreted as illustrative, and not in a limiting sense.

I claim as my invention:

A two part cladding mold split on a vertical plane and having a mold space open at the top for introduction of a slab to be clad, said mold having a pouring sprue having a vertically disposed portion extending from the top of the mold to substantially the level of the bottom of the mold space, and a horizontally disposed portion joining the lower part of the vertically disposed portion with the lower end of the mold space, a valve passageway extending from the top of the mold down to and intersecting the horizontally disposed portion of the sprue, and a valve plunger adapted to be plunged down said passageway into shutoff position across the horizontally disposed portion of said sprue to facilitate severing the sprue at a point adjacent the face of the clad slab when the cladding metal solidifies, said sprue mold space and valve passage lying on the vertical plane of the split of the mold whereby upon opening of the mold on said split, the solidified sprue, the valve plunger and cladded slab may readily be withdrawn from the mold.

THOMAS B. CHACE.